US011039395B1

United States Patent
Nagar et al.

(10) Patent No.: US 11,039,395 B1
(45) Date of Patent: Jun. 15, 2021

(54) OUT OF SERVICE NOTIFICATION AND DEACTIVATION OF RADIO FREQUENCY COMPONENTS

(71) Applicant: QUALCOMM Incorporated, San Diego, CA (US)

(72) Inventors: Nitish Nagar, Benares (IN); Swaroop Singh Kshatriya, Kurnool (IN); Gaurav Singh, Hyderabad (IN); Amit Kumar Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/692,622

(22) Filed: Nov. 22, 2019

(51) Int. Cl.
*H04W 52/02* (2009.01)
*H04W 88/02* (2009.01)

(52) U.S. Cl.
CPC ..... *H04W 52/028* (2013.01); *H04W 52/0241* (2013.01); *H04W 52/0254* (2013.01); *H04W 88/02* (2013.01)

(58) Field of Classification Search
CPC ........... H04W 52/028; H04W 52/0241; H04W 52/0254; H04W 88/02
See application file for complete search history.

(56) References Cited

U.S. PATENT DOCUMENTS

| | | | |
|---|---|---|---|
| 9,432,943 B2* | 8/2016 | Alam | H04W 52/0254 |
| 2008/0247377 A1* | 10/2008 | Van Horn | H04W 52/0225 370/348 |
| 2008/0268787 A1 | 10/2008 | Gholmieh et al. | |
| 2011/0151824 A1 | 6/2011 | Dai | |
| 2012/0100846 A1* | 4/2012 | Saini | H04W 48/08 455/424 |
| 2013/0322234 A1* | 12/2013 | Mohseni | H04W 52/0238 370/221 |
| 2014/0274030 A1* | 9/2014 | Aminzadeh | H04W 52/028 455/424 |
| 2015/0208327 A1* | 7/2015 | Baratam | H04W 48/16 455/432.1 |

FOREIGN PATENT DOCUMENTS

WO 2015038236 A1 3/2015

OTHER PUBLICATIONS

International Search Report and Written Opinion—PCT/US2020/061708—ISA/EPO—dated Mar. 10, 2021.

* cited by examiner

*Primary Examiner* — Marisol Figueroa
(74) *Attorney, Agent, or Firm* — Harrity & Harrity, LLP/Qualcomm

(57) ABSTRACT

Various aspects of the present disclosure generally relate to wireless communication. In some aspects, a user equipment (UE) may determine that a condition associated with failure of a cell acquisition procedure is satisfied; output a notification that permits a user of the UE to provide input indicating whether to deactivate one or more radio frequency components of the UE based at least in part on determining that the condition associated with failure of the cell acquisition procedure is satisfied; receive user input that indicates whether to deactivate the one or more radio frequency components of the UE based at least in part on outputting the notification; and selectively deactivate the one or more radio frequency components of the UE based at least in part on the user input. Numerous other aspects are provided.

30 Claims, 8 Drawing Sheets

OUT OF SERVICE NOTIFICATION AND DEACTIVATION OF RADIO FREQUENCY COMPONENTS

FIELD OF THE DISCLOSURE

Aspects of the present disclosure generally relate to wireless communication and to techniques and apparatuses for out of service notification and deactivation of radio frequency components.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a condition associated with failure of a cell acquisition procedure is satisfied; outputting a notification that permits a user of the UE to provide input indicating whether to deactivate one or more radio frequency components of the UE based at least in part on determining that the condition associated with failure of the cell acquisition procedure is satisfied; receiving user input that indicates whether to deactivate the one or more radio frequency components of the UE based at least in part on outputting the notification; and selectively deactivating the one or more radio frequency components of the UE based at least in part on the user input.

In some aspects, a method of wireless communication, performed by a UE, may include determining that a condition associated with failure of a cell acquisition procedure is satisfied, wherein the condition includes at least one of: a failure of the cell acquisition procedure a threshold number of times, a failure of the cell acquisition procedure to acquire a cell for a threshold duration, or a failure of the cell acquisition procedure the threshold number of times within a time period; and deactivating one or more radio frequency components of the UE based at least in part on determining that the condition associated with failure of the cell acquisition procedure is satisfied.

In some aspects, a UE for wireless communication may include memory and one or more processors operatively coupled to the memory. The memory and the one or more processors may be configured to determine that a condition associated with failure of a cell acquisition procedure is satisfied; output a notification that permits a user of the UE to provide input indicating whether to deactivate one or more radio frequency components of the UE based at least in part on determining that the condition associated with failure of the cell acquisition procedure is satisfied; receive user input that indicates whether to deactivate the one or more radio frequency components of the UE based at least in part on outputting the notification; and selectively deactivate the one or more radio frequency components of the UE based at least in part on the user input.

In some aspects, a UE for wireless communication may include memory and one or more processors operatively coupled to the memory. The memory and the one or more processors may be configured to determine that a condition associated with failure of a cell acquisition procedure is satisfied, wherein the condition includes at least one of: a failure of the cell acquisition procedure a threshold number of times, a failure of the cell acquisition procedure to acquire a cell for a threshold duration, or a failure of the cell acquisition procedure the threshold number of times within a time period; and deactivate one or more radio frequency components of the UE based at least in part on determining that the condition associated with failure of the cell acquisition procedure is satisfied.

In some aspects, a non-transitory computer-readable medium may store one or more instructions for wireless communication. The one or more instructions, when executed by one or more processors of a UE, may cause the one or more processors to: determine that a condition associated with failure of a cell acquisition procedure is satisfied; output a notification that permits a user of the UE to provide input indicating whether to deactivate one or more radio frequency components of the UE based at least in part on determining that the condition associated with failure of the cell acquisition procedure is satisfied; receive user input that indicates whether to deactivate the one or more radio frequency components of the UE based at least in part on outputting the notification; and selectively deactivate the one or more radio frequency components of the UE based at least in part on the user input.

In some aspects, a non-transitory computer-readable medium may store one or more instructions for wireless communication. The one or more instructions, when executed by one or more processors of a UE, may cause the one or more processors to: determine that a condition associated with failure of a cell acquisition procedure is satisfied, wherein the condition includes at least one of: a failure of the cell acquisition procedure a threshold number of times, a failure of the cell acquisition procedure to acquire a cell for a threshold duration, or a failure of the cell acquisition procedure the threshold number of times within a time period; and deactivate one or more radio frequency components of the UE based at least in part on determining that the condition associated with failure of the cell acquisition procedure is satisfied.

In some aspects, an apparatus for wireless communication may include means for determining that a condition associated with failure of a cell acquisition procedure is satisfied; means for outputting a notification that permits a user of the apparatus to provide input indicating whether to deactivate one or more radio frequency components of the apparatus based at least in part on determining that the condition associated with failure of the cell acquisition procedure is satisfied; means for receiving user input that indicates whether to deactivate the one or more radio frequency components of the apparatus based at least in part on outputting the notification; and means for selectively deactivating the one or more radio frequency components of the apparatus based at least in part on the user input.

In some aspects, an apparatus for wireless communication may include means for determining that a condition associated with failure of a cell acquisition procedure is satisfied, wherein the condition includes at least one of: a failure of the cell acquisition procedure a threshold number of times, a failure of the cell acquisition procedure to acquire a cell for a threshold duration, or a failure of the cell acquisition procedure the threshold number of times within a time period; and means for deactivating one or more radio frequency components of the apparatus based at least in part on determining that the condition associated with failure of the cell acquisition procedure is satisfied.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
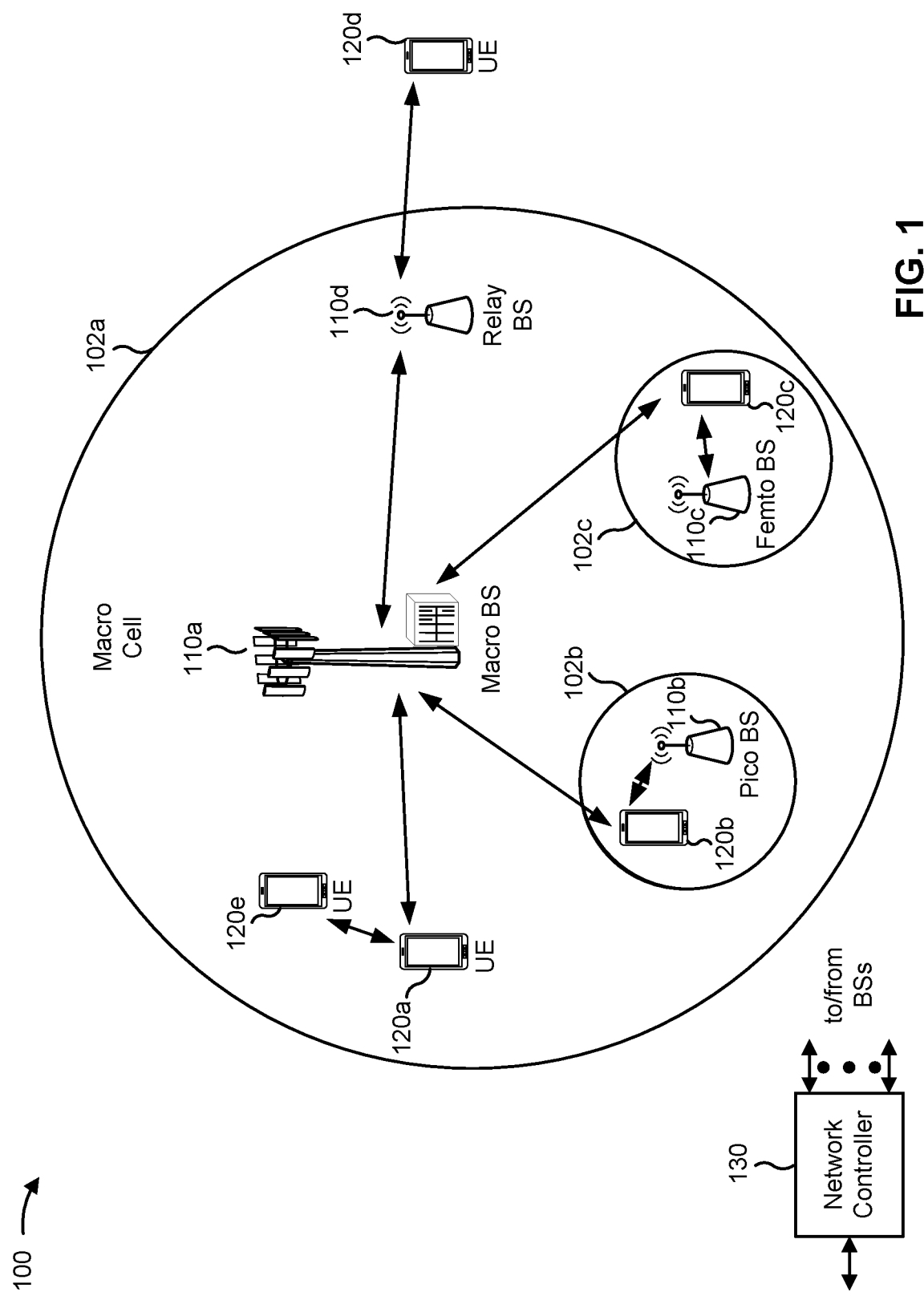
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
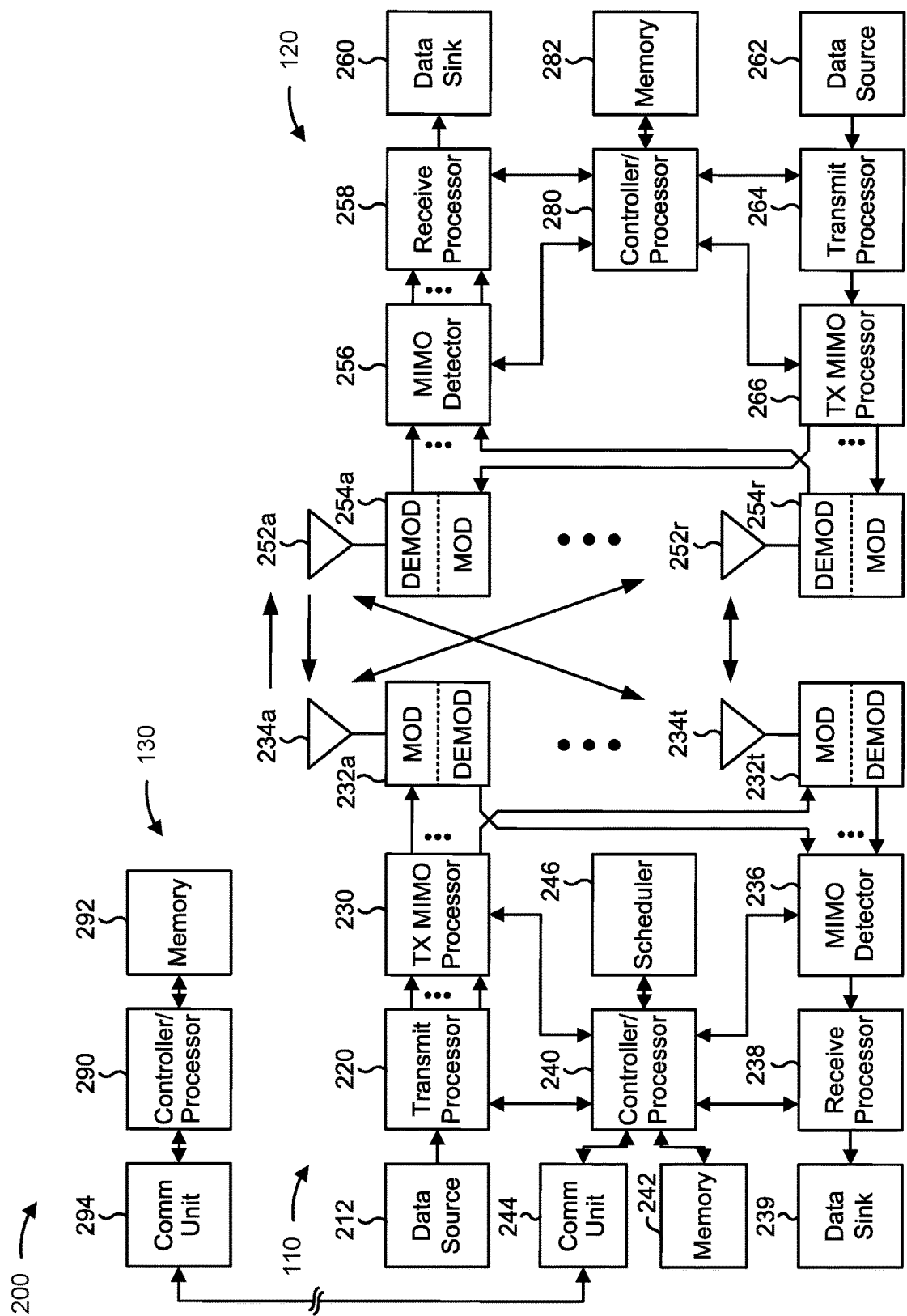
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be, respectively, one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with out of service notification and deactivation of radio frequency components, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, process 800 of FIG. 8, and/or other processes as described herein. A scheduler 246 may schedule UEs for data transmission on the downlink and/or uplink.

In some aspects, UE 120 may include means for determining that a condition associated with failure of a cell acquisition procedure is satisfied; means for outputting a notification that permits a user of the UE 120 to provide input indicating whether to deactivate one or more radio frequency components of the UE 120 based at least in part on determining that the condition associated with failure of the cell acquisition procedure is satisfied; means for receiving user input that indicates whether to deactivate the one or more radio frequency components of the UE 120 based at least in part on outputting the notification; means for selectively deactivating the one or more radio frequency components of the UE 120 based at least in part on the user input; and/or the like. Additionally, or alternatively, UE 120 may include means for determining that a condition associated with failure of a cell acquisition procedure is satisfied, wherein the condition includes at least one of: a failure of the cell acquisition procedure a threshold number of times, a failure of the cell acquisition procedure to acquire a cell for a threshold duration, or a failure of the cell acquisition procedure the threshold number of times within a time period; means for deactivating one or more radio frequency components of the apparatus based at least in part on determining that the condition associated with failure of the cell acquisition procedure is satisfied; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
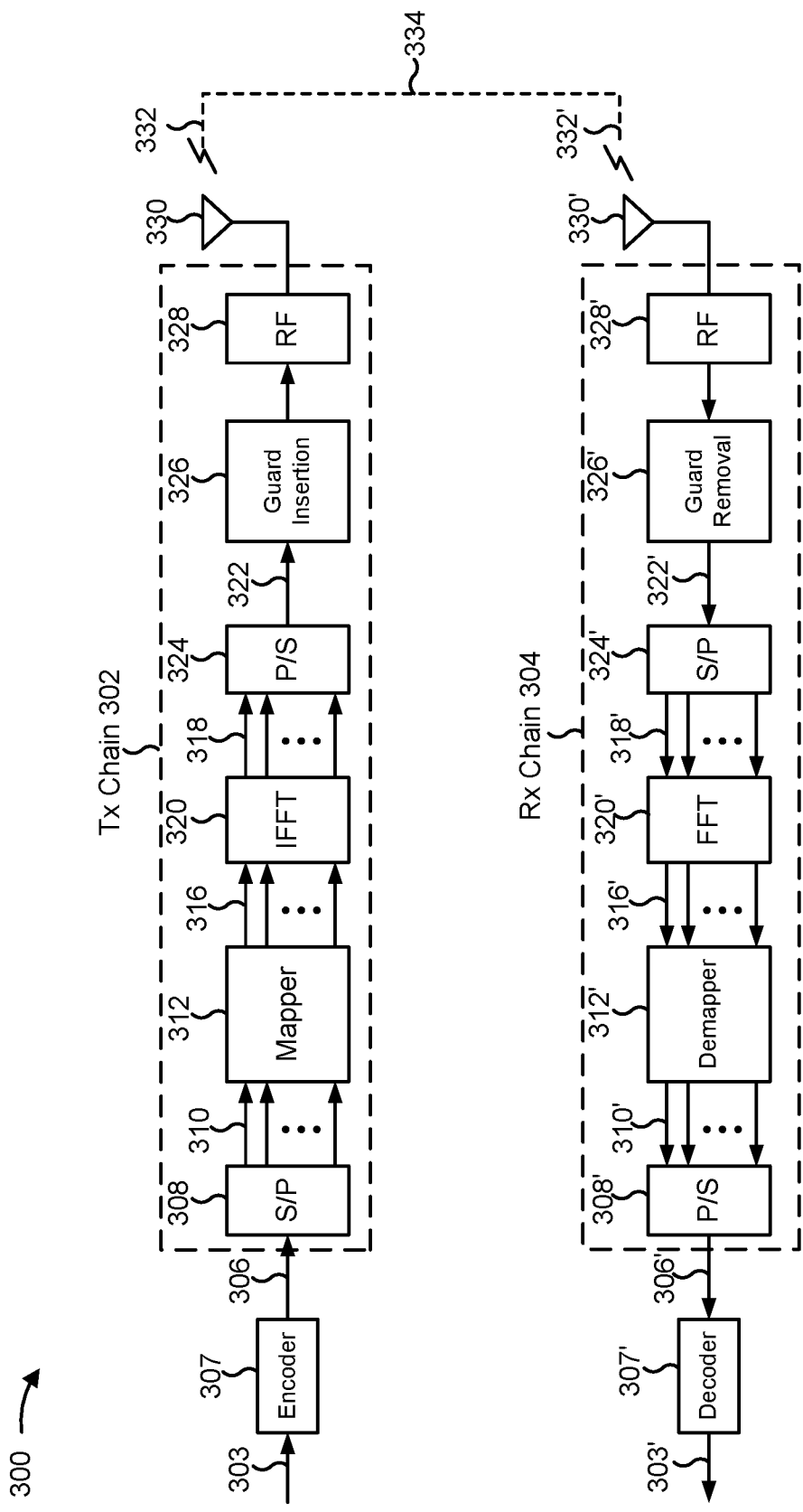
FIG. 3 is a diagram illustrating an example of a transmit chain and a receive chain of a UE, in accordance with various aspects of the present disclosure.

FIG. 3 is a diagram illustrating an example 300 of a transmit (Tx) chain 302 and a receive (Rx) chain 304 of a UE 120, in accordance with various aspects of the present disclosure. In some aspects, one or more components of Tx chain 302 may be implemented in transmit processor 264, TX MIMO processor 266, MOD/DEMOD 254, controller/processor 280, and/or the like, as described above in connection with FIG. 2. In some aspects, Tx chain 302 may be implemented in UE 120 for transmitting data 306 (e.g., uplink data, an uplink reference signal, uplink control information, and/or the like) to base station 110 on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to $N_g$, (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, MOD/DEMOD 254, controller/processor 280, and/or the like, as described above in connection with FIG. 2. In some aspects, Rx chain 304 may be implemented in UE 120 for receiving data 306 (e.g., downlink data, a downlink reference signal, downlink control information, and/or the like) from base station 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

To acquire a cell for a network connection, a UE 120 may perform a cell acquisition procedure. The cell acquisition procedure may include using one or more radio frequency (RF) components to scan (e.g., monitor) for one or more reference signals associated with cell acquisition, such as a primary synchronization signal (PSS), a secondary synchronization signal (SSS), a synchronization signal block (SSB), one or more signals on a physical broadcast channel (PBCH), and/or the like. If the UE 120 is unable to successfully acquire a cell, such as by failing to detect the one or more reference signals associated with cell acquisition, the UE 120 may continue to scan for the one or more reference signals. This can quickly drain a battery of the UE 120, especially if the UE 120 is located in a remote geographic area and is unlikely to acquire a cell. Some techniques and apparatuses described herein enable the UE 120 to deactivate one or more RF components based at least in part on repeated failure of a cell acquisition procedure, thereby conserving battery power of the UE 120. Some of these techniques and apparatuses involve user input to deactivate the one or more RF components, thereby notifying the user of the lack of coverage.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
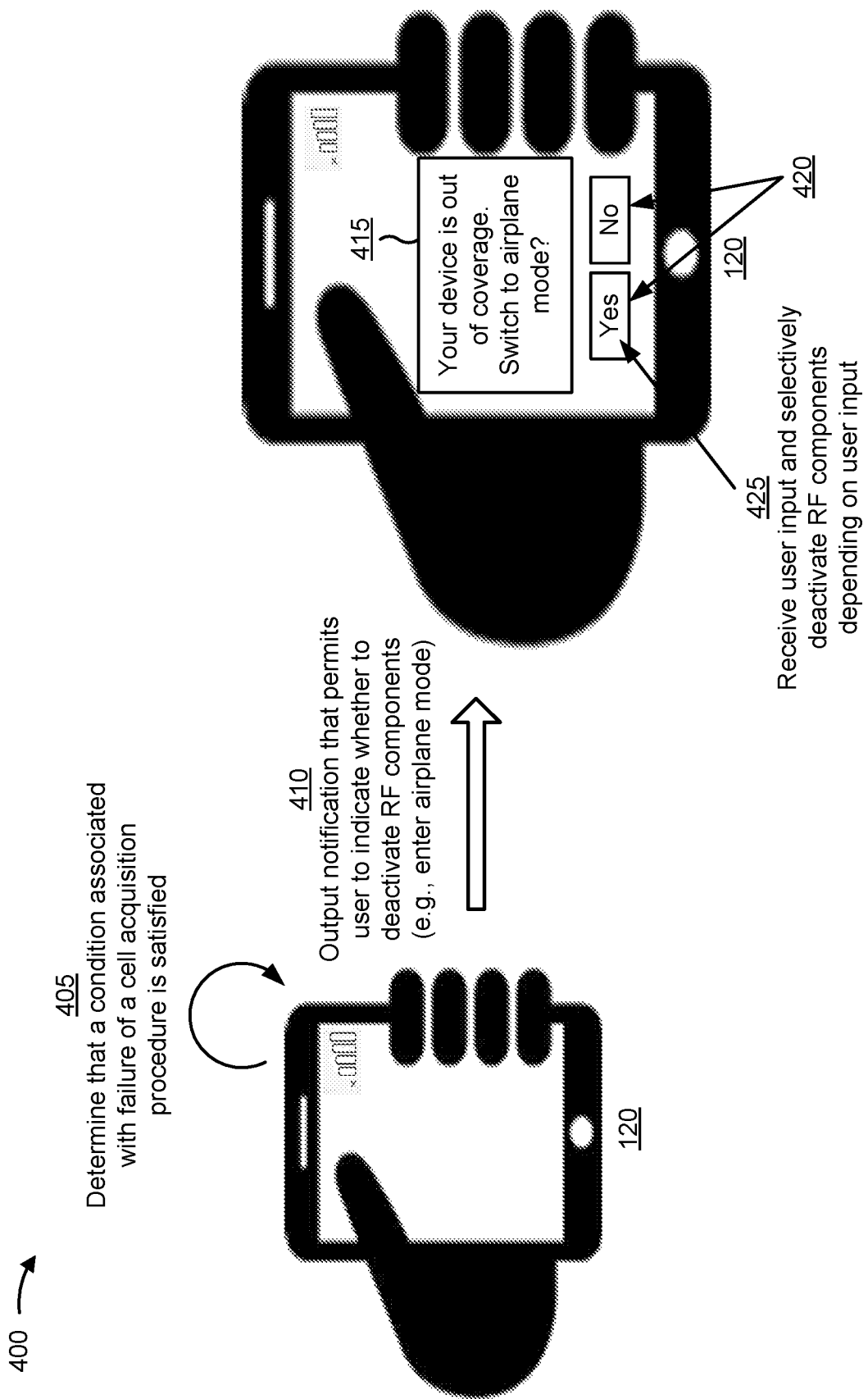
FIGS. 4-6 are diagrams illustrating examples of out of service notification and deactivation of radio frequency components, in accordance with various aspects of the present disclosure.

FIG. 4 is a diagram illustrating an example 400 of out of service notification and deactivation of radio frequency components, in accordance with various aspects of the present disclosure.

As shown by reference number 405, the UE 120 may determine that a condition, associated with failure of a cell acquisition procedure, is satisfied. For example, the UE 120 may determine that the cell acquisition procedure has failed a threshold number of times, may determine that the cell acquisition procedure has failed to acquire a cell for a threshold duration, may determine that the cell acquisition procedure has failed a threshold number of times within a threshold time period, and/or the like. In some aspects, this condition may be referred to as a deactivation condition.

In some aspects, the UE 120 may determine that the cell acquisition procedure has failed a threshold number of times. In this case, the UE 120 may store a counter value that indicates a number of times that the cell acquisition procedure has failed. After performing a cell acquisition procedure, the UE 120 may determine whether the cell acquisition procedure succeeded (e.g., whether the UE 120 was able to acquire a cell, receive one or more reference signals for the cell, camp on the cell, establish a network connection with a base station 110 that serves the cell, and/or the like). If the UE 120 determines that the cell acquisition procedure succeeded, then the UE 120 may reset the counter value. If the UE 120 determines that the cell acquisition procedure failed, then the UE 120 may increment the counter value, and may compare the counter value to a threshold number. If the counter value satisfies the threshold number (e.g., is greater than or equal to the threshold number), then the UE 120 may determine that the condition associated with failure of the cell acquisition procedure is satisfied. The threshold number may be stored in memory of the UE 120, may be configured for the UE 120 by a base station 110 (e.g., during a previous network connection), and/or the like.

Additionally, or alternatively, the UE 120 may determine that the cell acquisition procedure has failed a threshold number of times within a threshold time period. In this case, in addition to determining whether the cell acquisition procedure has failed the threshold number of times, as described above, the UE 120 may determine whether the threshold number of failures occurred within a threshold time period (e.g., 5 failures within 2 minutes, 3 failures within 1 minute, among other examples). In some aspects, the threshold time period may be stored in memory of the UE 120, may be configured for the UE 120 by a base station 110 (e.g., during a previous network connection), and/or the like.

Additionally, or alternatively, the UE 120 may determine that a timer associated with the cell acquisition procedure (e.g., a cell acquisition timer) has expired. For example, the UE 120 may initialize the timer upon powering on, upon losing a network connection, and/or the like. In some aspects, the UE 120 may initialize the timer in association with performing an initial cell acquisition procedure (e.g., an initial cell acquisition procedure after powering on, losing a previous network connection, and/or the like). After performing a cell acquisition procedure (e.g., the initial cell acquisition procedure or a subsequent cell acquisition procedure), the UE 120 may determine whether the cell acquisition procedure succeeded, as described above. If the UE 120 determines that the cell acquisition procedure succeeded, then the UE 120 may disable the timer. If the UE 120 determines that the cell acquisition procedure failed, then the UE 120 may continue to run the timer. If the timer expires (e.g., elapses) before the UE 120 successfully acquires a cell, then the UE 120 may determine that the condition associated with failure of the cell acquisition procedure is satisfied. A duration of the timer (e.g., an initial value with which the timer is initialized) may be stored in memory of the UE 120, may be configured for the UE 120 by a base station 110 (e.g., during a previous network connection), and/or the like.

As used herein, a cell acquisition procedure may refer to a procedure to attempt to acquire a cell. Performing the cell acquisition procedure may include performing one or more scans of one or more portions of the RF spectrum. For example, performing the cell acquisition procedure may include performing an acquisition database scan, a full band scan, a full RAT scan, and/or the like. An acquisition database scan may refer to a scan of a frequency (or a set of frequencies) of a cell on which the UE 120 was most recently camped (e.g., prior to losing a network connection). A full band scan may refer to a scan of all frequencies of a particular RAT (e.g., a RAT of a cell on which the UE 120 was most recently camped). A full RAT scan may refer to a scan of all frequencies of all RATs (e.g., all WWAN RATs) that the UE 120 is capable of using (e.g., a 5G or NR RAT, a 4G or LTE RAT, a CDMA RAT, a WCDMA RAT, a GSM RAT, and/or the like). In some aspects, a cell acquisition procedure may include an acquisition database scan, a full band scan, and a full RAT scan. Additional details and an example cell acquisition procedure are described below in connection with FIG. 5.

As shown by reference number 410, the UE 120 may output a notification that permits a user of the UE to provide input indicating whether to deactivate one or more radio frequency (RF) components of the UE 120 (e.g., whether to enter an airplane mode). The UE 120 may output the notification based at least in part on determining that the condition associated with failure of the cell acquisition procedure is satisfied.

As shown by reference number 415, the notification may include a message indicating that the UE 120 is out of a coverage area, or may include a similar type of message that includes information associated with the failure of the cell acquisition procedure. For example, the message may indicate that the UE 120 is unable to acquire a cell or a connection to a network (e.g., a cellular network, a wireless wide area network (WWAN), and/or the like), may indicate a number of times that the cell acquisition procedure failed, may indicate a length of time that the UE 120 has been out of coverage, and/or the like.

As shown by reference number 420, the notification may include one or more input mechanisms (show as buttons as an example) that permits (e.g., enables) the user to provide input indicating whether to deactivate one or more RF components of the UE 120 (e.g., whether to enter the airplane mode). For example, the UE 120 may provide a first input mechanism (shown as a "Yes" button) that enables the user to indicate that the UE 120 is to deactivate the one or more RF components, and/or may provide a second input mechanism (shown as a "No" button) that enables the user to indicate that the UE 120 is not to deactivate the one or more RF components. Although the notifications (e.g., the message and the input mechanisms) are shown as visual notifications, other types of notifications may be used, such as an audio notification, a tactile notification, and/or the like. Furthermore, other types of input mechanisms may be used, such as a physical button on the UE 120 (as an alternative to or in addition to the touch screen buttons shown in FIG. 4), voice input, and/or the like.

As shown by reference number 425, the UE 120 may receive user input that indicates whether to deactivate the one or more RF components of the UE 120. For example, the UE 120 may receive the user input based at least in part on outputting the notification and receiving user input in response to the notification (e.g., via the one or more input mechanisms). The UE 120 may selectively deactivate the one or more RF components based at least in part on the user input. For example, if the user input indicates to deactivate the one or more RF components (e.g., via user interaction with the "Yes" button), then the UE 120 may deactivate the one or more RF components based at least in part on the user input. Alternatively, if the user input indicates not to deactivate the one or more RF components (e.g., via user interaction with the "No" button), then the UE 120 may refrain from deactivating the one or more RF components based at least in part on the user input.

Deactivation of the one or more RF components prevents communication via one or more wireless networks. For example, deactivation of the one or more RF components may prevent communication via one or more of a WWAN (e.g., a cellular network, a 5G network, an LTE network, a CDMA network, a GSM network, and/or the like), a wireless local area network (WLAN) (e.g., a Wi-Fi network), a wireless personal area network (WPAN) (e.g., a Bluetooth network, a Bluetooth Low Energy (BLE) network, and/or the like), a near field communication (NFC) network, a global positioning system (GPS) network, and/or the like. As used herein, the term airplane mode may refer to a mode of the UE 120 when one or more RF components are deactivated. In this case, deactivating the one or more RF components may be referred to as entering (e.g., enabling or activating) the airplane mode.

In some aspects, a user of the UE 120 may input a setting that indicates a first set of wireless networks for which communication is to be prevented when the UE 120 is in the airplane mode and/or a second set of wireless networks for which communication is to be enabled when the UE 120 is in the airplane mode, and the UE 120 may deactivate one or more RF components according to the setting (e.g., to prevent communication on the first set of wireless networks and enable communication on the second set of wireless networks). In some aspects, GPS may be enabled when the UE 120 is in the airplane mode to enable the UE 120 to determine when to exit the airplane mode, as described in more detail below.

As an example, the one or more RF components may include one or more components of the UE 120 described above in connection with FIG. 2 and/or FIG. 3, such as a modem (e.g., MOD/DEMOD 254), a MIMO detector 256, a receive processor 258, a controller/processor 280, a transmit processor 264, a TX MIMO processor 266, an encoder 307, a decoder 307', one or more components of Tx chain 302, one or more components of Rx chain 304, and/or the like. In some aspects, the UE 120 may include separate Tx chains, separate Rx chains, and/or separate RF components for communicating via different wireless networks (e.g., a WWAN, a WLAN, a WPAN, GPS, NFC, and/or the like). In this case, to deactivate communications for a particular type of network, the UE 120 may deactivate one or more RF components that enable communication for the particular type of network.

In some aspects, the UE 120 may deactivate the one or more RF components while waiting for the user input. For example, the UE 120 may deactivate the one or more RF components after outputting the notification and before receiving the user input. In this way, battery power may be conserved. Alternatively, the UE 120 may keep the one or more RF components activated while waiting for the user input, and/or may continue to perform a cell acquisition procedure while waiting for the user input. For example, the UE 120 may keep the one or more RF components activated after outputting the notification and before receiving the user input. If cell acquisition is successful while waiting for the user input, the UE 120 may cancel the notification (e.g., by removing the notification from the screen). In some aspects, if the UE 120 deactivates the one or more RF components while waiting for the user input, the UE 120 may activate (e.g., reactivate) the one or more RF components and/or perform the cell acquisition procedure based at least in part on a determination that the user input has not been received for a threshold amount of time (e.g., according to a timer).

In some aspects, after deactivating the one or more RF components, the UE 120 may activate (e.g., reactivate) the one or more RF components and/or perform a cell acquisition procedure based at least in part on determining that a condition (referred to herein as an activation condition) is satisfied. As described in more detail below, the activation condition may include, for example, expiration of an activation timer that is initialized upon deactivating the one or more radio frequency components, a determination that a current GPS location of the UE 120 differs from a prior GPS location of the UE 120 by a threshold amount, a determination that the current GPS location of the UE 120 is associated with network coverage, a determination that a stored network identifier (e.g., a WLAN identifier, a WPAN identifier, and/or the like) has been detected, a determination that a threshold number of wireless networks (e.g., WLANs, WPANs, and/or the like) have been detected, and/or the like. Activating or reactivating the one or more RF components may be referred to as exiting (e.g., disabling or deactivating) the airplane mode.

In some aspects, the UE 120 may exit the airplane mode based at least in part on expiration of a timer (e.g., an activation timer). For example, the UE 120 may initialize the timer upon receiving the user input, deactivating the one or more RF components, entering the airplane mode, and/or the like. When the timer expires (e.g., elapses), then the UE 120 may exit the airplane mode (e.g., to attempt the cell acquisition procedure). A duration of the timer (e.g., an initial value with which the timer is initialized) may be stored in memory of the UE 120, may be configured for the UE 120 by a base station 110 (e.g., during a previous network connection), and/or the like.

Additionally, or alternatively, the UE 120 may exit the airplane mode based at least in part on a determination that a current GPS location of the UE 120 differs from a prior GPS location of the UE 120 by a threshold amount (e.g., a threshold distance). The prior GPS location may be a GPS location of the UE 120 during performance of the cell acquisition procedure, while the notification is being output, when the one or more RF components are deactivated, and/or the like. If the current GPS location (e.g., which may be updated by the UE 120 over time and/or periodically) differs from the prior GPS location by a threshold amount, then the UE 120 may have moved into a coverage area. Thus, the UE 120 may exit the airplane mode and attempt cell acquisition. The threshold amount (e.g., the threshold distance) may be stored in memory of the UE 120, may be configured for the UE 120 by a base station 110 (e.g., during a previous network connection), and/or the like.

Additionally, or alternatively, the UE 120 may exit the airplane mode based at least in part on a determination that the current GPS location of the UE 120 is associated with network coverage. For example, the UE 120 may store information that indicates one or more GPS locations and/or a geofence of GPS locations that are associated with network coverage (e.g., within which the UE 120 has network coverage, such as WWAN coverage, cellular coverage, and/or the like). In this case, if the UE 120 enters the geofence and/or a GPS location associated with network coverage, then the UE 120 may exit the airplane mode and attempt cell acquisition.

Additionally, or alternatively, the UE 120 may exit the airplane mode based at least in part on a determination that a stored network identifier (e.g., a WLAN identifier, a WPAN identifier, and/or the like) has been detected. In some aspects, the stored network identifier may be associated with network coverage. For example, when the UE 120 is within range of a wireless network identified by the stored network identifier (e.g., a wireless network associated with the user's home or work), then the UE 120 may have WWAN coverage. In this case, if the UE 120 can detect a network identifier of the wireless network, then the UE 120 may exit the airplane mode and attempt cell acquisition.

Additionally, or alternatively, the UE 120 may exit the airplane mode based at least in part on a determination that a threshold number of wireless networks (e.g., WLANs, WPANs, and/or the like) have been detected. When the UE 120 can detect a threshold number of wireless networks, then this may indicate that the UE 120 is no longer located in a remote geographic area. In this case, the UE 120 may exit the airplane mode and attempt cell acquisition. In some aspects, the UE 120 may compare a prior number of wireless networks detected during performance of the cell acquisition procedure, while the notification is being output, when the one or more RF components are deactivated, within a threshold amount of time after deactivating the one or more RF components, and/or the like, to a current number of wireless networks detected by the UE 120. If the current number of wireless networks satisfies a threshold with respect to the prior number of wireless networks (e.g., is greater than the prior number by a threshold amount), then the UE 120 may exit the airplane mode and attempt cell acquisition.

Although some techniques are described herein in connection with deactivating one or more RF components based at least in part on receiving user input, in some aspects, the UE 120 may deactivate the one or more RF components without receiving user input. For example, the UE 120 may determine that a condition associated with failure of a cell acquisition procedure is satisfied (as described above), and may deactivate the one or more RF components based at least in part on determining that the condition associated with failure of the cell acquisition procedure is satisfied. In some aspects, a user of the UE 120 may provide input to set a user setting to permit the UE 120 to deactivate the one or more RF components when the condition is satisfied. In some aspects, the user setting may indicate one or more deactivation conditions to be used by the UE 120 and/or one or more activation conditions to be used by the UE 120, as described above, and the UE 120 may monitor for the condition(s) and deactivate or reactivate the one or more RF components according to the user setting.

As indicated above, FIG. 4 is provided as an example. Other examples may differ from what is described with regard to FIG. 4.

Figure 5:
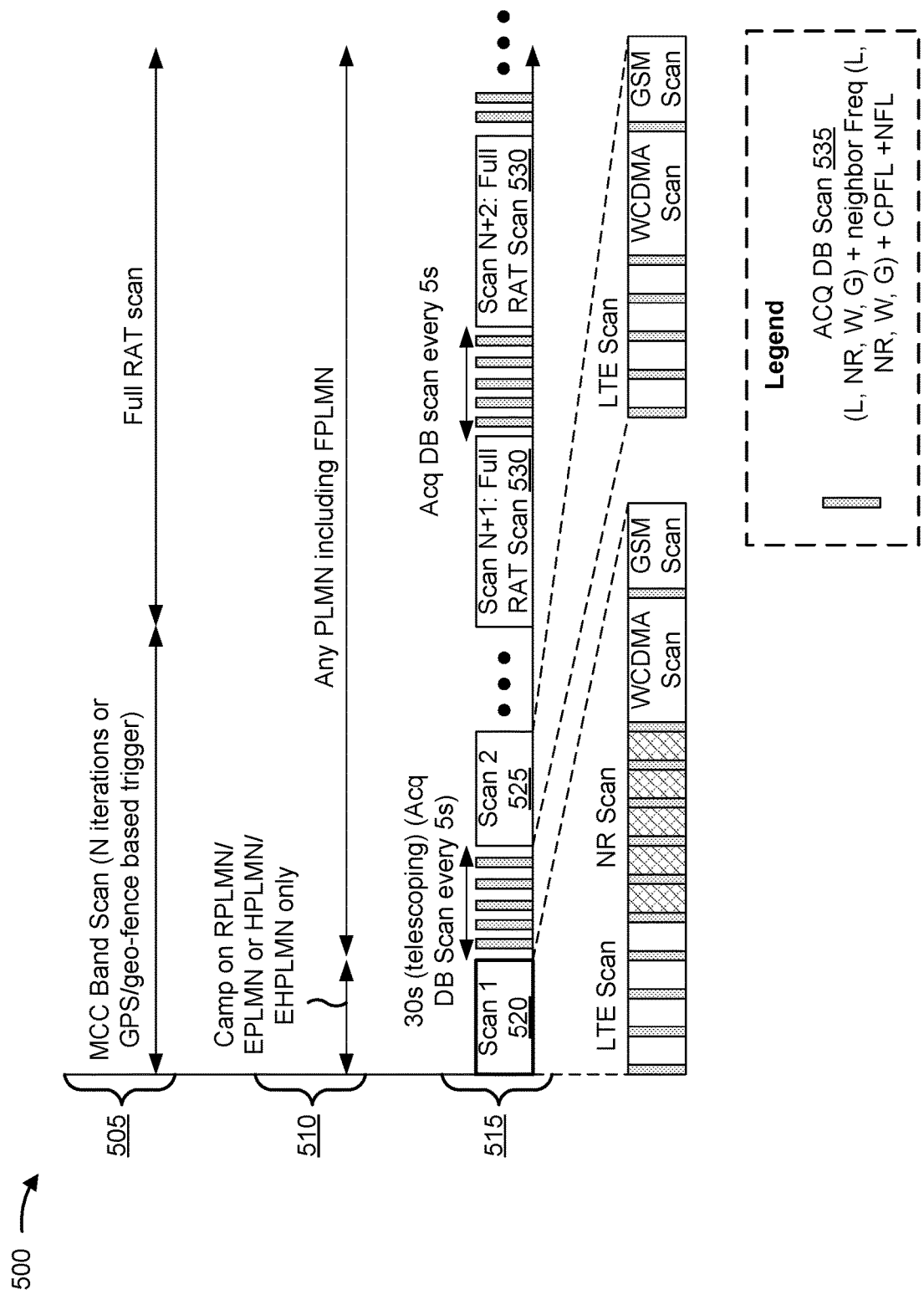

FIG. 5 is a diagram illustrating an example 500 of out of service notification and deactivation of radio frequency components, in accordance with various aspects of the present disclosure. FIG. 5 shows various examples of a cell acquisition procedure.

As shown by reference number 505, a cell acquisition procedure may include a mobile country code (MCC) scan and/or a full RAT scan. In some aspects, the cell acquisition procedure may include performing the full RAT scan after performing the MCC scan. In some aspects, the UE 120 may perform the full RAT scan after performing the MCC scan a threshold number of times (e.g., for N iterations). Additionally, or alternatively, the UE 120 may perform the MCC scan within a certain GPS geofence, and may perform the full RAT scan outside of the GPS geofence.

As shown by reference number 510, a cell acquisition procedure may include a frequency scan for one or more public land mobile networks (PLMNs), such as a registered PLMN (RPLMN), an equivalent PLMN (EPLMN), a home PLMN (HPLMN), an equivalent home PLMN (EHPLMN), a roaming PLMN, a forbidden PLMN (FPLMN), and/or the like. In some aspects, the UE 120 may perform a first scan in association with one or more RPLMNs, EPLMNs, HPLMNs, and/or EHPLMNs, and may perform a second scan in association with one or more FPLMNs if the first scan fails.

As shown by reference number 515, a cell acquisition procedure may include a first MCC scan 520 that includes scanning all RATs supported by the UE 120 (e.g., including an NR RAT scan, as shown), a second MCC scan 525 that does not include scanning all RATs supported by the UE 120 (e.g., excluding an NR RAT scan, as shown), a full RAT scan 530, an acquisition database scan 535, and/or the like. In some aspects, these scans may be performed in a particular order, and/or certain types of scans may be performed multiple times within a cell acquisition procedure. For example, an acquisition database scan may be performed multiple times (e.g., shown as every five seconds) between other types of scans, such as between MCC scans 520/525, between full RAT scans 530, and/or the like. Additionally, or alternatively, an acquisition database scan may be performed one or more times as part of an MCC scan 520/525 and/or as part of a full RAT scan 530.

In some aspects, the UE 120 may determine that a cell acquisition procedure has failed based at least in part on determining that a full RAT scan 530 has failed. In this case, a single cell acquisition procedure may fail once if a full RAT scan 530 fails once, including multiple acquisition database scan failures (e.g., which may be performed multiples times within or between full RAT scans 530).

As indicated above, FIG. 5 is provided as an example. Other examples may differ from what is described with regard to FIG. 5.

Figure 6:
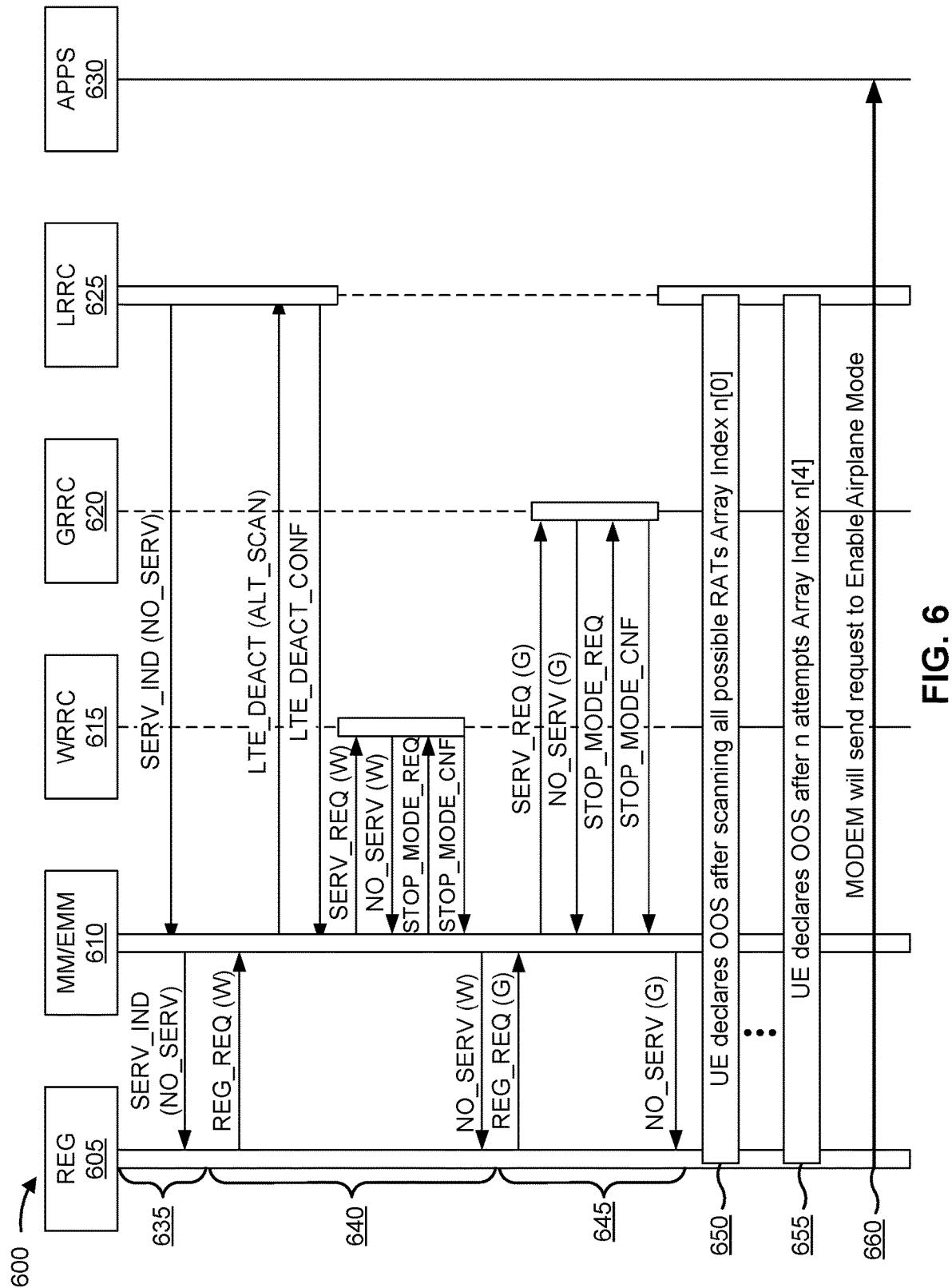

FIG. 6 is a diagram illustrating an example 600 of out of service notification and deactivation of radio frequency components, in accordance with various aspects of the present disclosure. As shown in FIG. 6, a UE 120 may include a registration module (REG) 605, a modem module (MM) or enhanced modem module (EMM) (collectively MM/EMM) 610, a WCDMA radio resource control (RRC) module (WRRC) 615, a GSM RRC module (GRRC) 620, an LTE RRC module (shown as LRRC) 625, and an application module (shown as APPS) 630.

As shown by reference number 635, a UE 120 may fail to connect to an LTE network. For example, the LRRC 625 may send a no service indication, shown as SERV_IND (NO_SERV), to MM/EMM 610. As shown, MM/EMM 610 may send the no service indication to REG 605. Based at least in part on receiving the no service indication at REG 605, the UE 120 may determine that an LTE scan has failed.

As shown by reference number 640, a UE 120 may fail to connect to a WCDMA network. For example, the REG 605 may send a WCDMA registration request, shown as REG_REQ(W), to the MM/EMM 610. The MM/EMM 610 may send a deactivation instruction to the LRRC 625, shown as LTE_DEACT(ALT_SCAN). The LRRC 625 may confirm deactivation, and may send a deactivation confirmation message, shown as LTE_DEACT_CONF, to the MM/EMM 610. The MM/EMM 610 may then send a WCDMA service request, shown as SERV_REQ(W), to the WRRC 615. The WRRC may detect failure to obtain a WCDMA cell, and may send a no service indication, shown as NO_SERV(W), to the MM/EMM 610. The MM/EMM 610 and the WRRC may exchange messages, shown as STOP_MODE_REQ and STOP_MODE_CNF, to stop attempting to acquire the WCDMA network. The MM/EMM 610 may send the no service indication to REG 605. Based at least in part on receiving the no service indication at REG 605, the UE 120 may determine that a WCDMA scan has failed.

As shown by reference number 645, a UE 120 may fail to connect to a GSM network. For example, the REG 605 may send a GSM registration request, shown as REG_REQ(G), to the MM/EMM 610. The MM/EMM 610 may send a GSM service request, shown as SERV_REQ(G), to the GRRC 620. The GRRC 620 may detect failure to obtain a GSM cell, and may send a no service request, shown as NO_SERV (G), to the MM/EMM 610. The MM/EMM 610 and the WRRC may exchange messages, shown as STOP_MO-DE_REQ and STOP_MODE_CNF, to stop attempting to acquire the GSM network. The MM/EMM 610 may send the no service indication to REG 605. Based at least in part on receiving the no service indication at REG 605, the UE 120 may determine that a GSM scan has failed.

As shown by reference number 650, the UE 120 may determine that the cell acquisition procedure has failed, such as by declaring out of service (OOS) after performing the scans described above. The UE 120 may increment a counter having an initial value of zero (shown as Array index n[0]). As shown by reference number 655, the UE 120 may repeat the scans described above until the counter reaches a threshold value (shown as Array index n[4]), at which point the UE 120 may determine that the cell acquisition procedure has failed the threshold number of times. As shown by reference number 660, the UE 120 may enable an airplane mode for the UE 120 (e.g., without user input) or may request to enable the airplane mode for the UE 120 (e.g., with user input) based at least in part on determining that the cell acquisition procedure has failed the threshold number of times. In this way, battery power of the UE 120 may be conserved.

Although FIG. 6 shows performing an LTE scan, a WCDMA scan, and a GSM scan as part of a cell acquisition procedure, the cell acquisition procedure may include fewer scans (e.g., including fewer RATs), more scans (e.g., including more RATs, such as an NR RAT), and/or a different combination of scans than shown in FIG. 6.

As indicated above, FIG. 6 is provided as an example. Other examples may differ from what is described with regard to FIG. 6.

Figure 7:
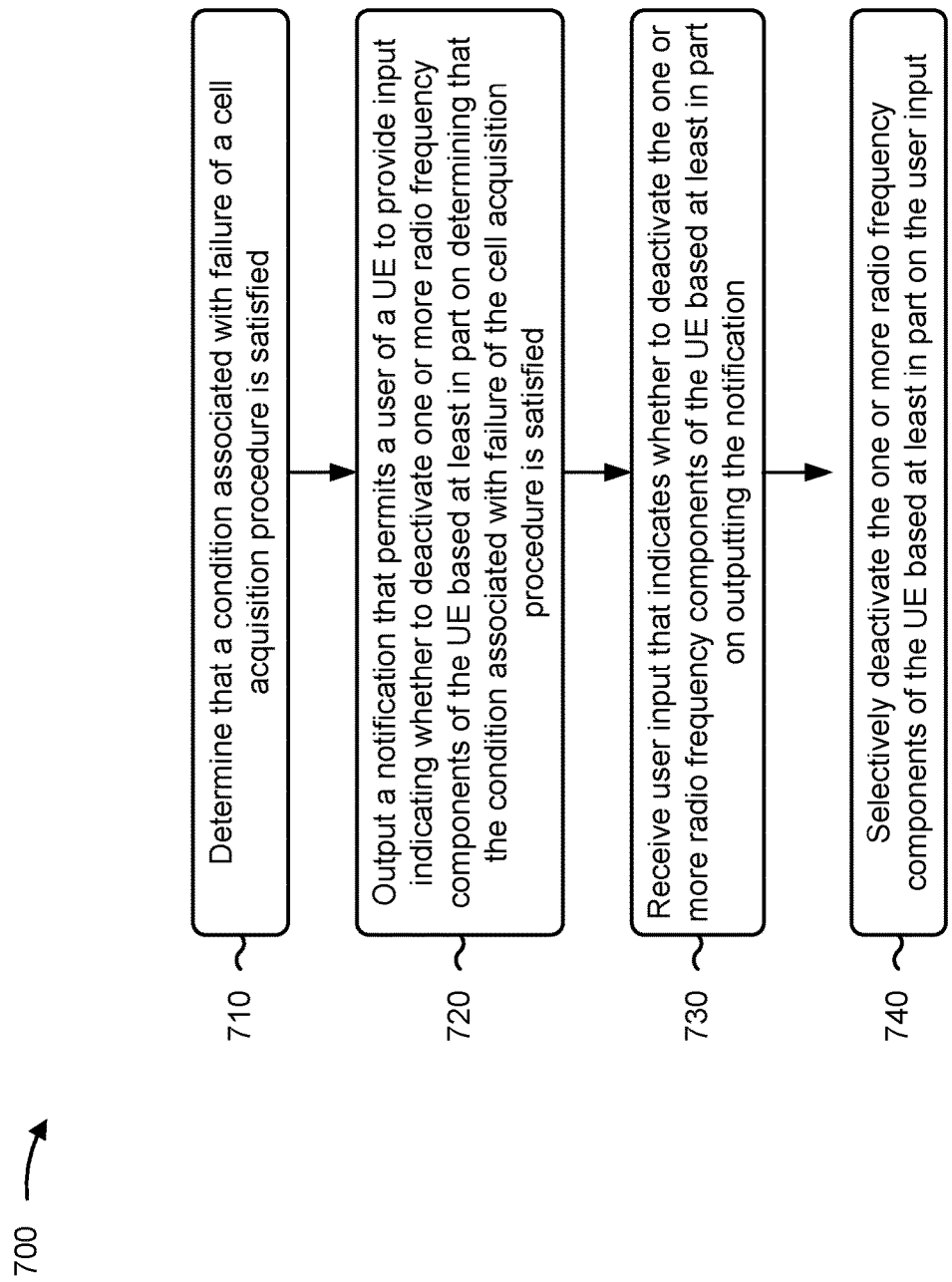
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with out of service notification and deactivation of radio frequency components.

As shown in FIG. 7, in some aspects, process 700 may include determining that a condition associated with failure of a cell acquisition procedure is satisfied (block 710). For example, the UE (e.g., using receive processor 258, controller/processor 280, memory 282, and/or the like) may determine that a condition associated with failure of a cell acquisition procedure is satisfied, as described above.

As further shown in FIG. 7, in some aspects, process 700 may include outputting a notification that permits a user of the UE to provide input indicating whether to deactivate one or more radio frequency components of the UE based at least in part on determining that the condition associated with failure of the cell acquisition procedure is satisfied (block 720). For example, the UE (e.g., using controller/processor 280, memory 282, and/or the like) may output a notification that permits a user of the UE to provide input indicating whether to deactivate one or more radio frequency components of the UE based at least in part on determining that the condition associated with failure of the cell acquisition procedure is satisfied, as described above.

As further shown in FIG. 7, in some aspects, process 700 may include receiving user input that indicates whether to deactivate the one or more radio frequency components of the UE based at least in part on outputting the notification (block 730). For example, the UE (e.g., using controller/processor 280, memory 282, and/or the like) may receive user input that indicates whether to deactivate the one or more radio frequency components of the UE based at least in part on outputting the notification, as described above.

As further shown in FIG. 7, in some aspects, process 700 may include selectively deactivating the one or more radio frequency components of the UE based at least in part on the user input (block 740). For example, the UE (e.g., using receive processor 258, controller/processor 280, memory 282, and/or the like) may selectively deactivate the one or more radio frequency components of the UE based at least in part on the user input, as described above.

Process 700 may include additional aspects, such as any single aspect or any combination of aspects described below and/or in connection with one or more other processes described elsewhere herein.

In a first aspect, the condition includes at least one of a failure of the cell acquisition procedure a threshold number of times, a failure of the cell acquisition procedure to acquire a cell for a threshold duration, or a failure of the cell acquisition procedure the threshold number of times within a time period.

In a second aspect, alone or in combination with the first aspect, the cell acquisition procedure includes at least one of an acquisition database scan, a full band scan, a full RAT scan, or a combination thereof.

In a third aspect, alone or in combination with one or more of the first and second aspects, determining that the condition associated with failure of the cell acquisition procedure is satisfied comprises: determining that the cell acquisition procedure has failed; incrementing a counter value that indicates a number of times that the cell acquisition procedure has failed; and determining that the counter value satisfies a threshold.

In a fourth aspect, alone or in combination with one or more of the first through third aspects, determining that the condition associated with failure of the cell acquisition procedure is satisfied comprises: initializing a timer upon performing an initial cell acquisition procedure after powering on the UE or losing a network connection; and determining that the timer has expired without successfully acquiring a cell.

In a fifth aspect, alone or in combination with one or more of the first through fourth aspects, deactivation of the one or more radio frequency components prevents communication via one or more wireless networks.

In a sixth aspect, alone or in combination with one or more of the first through fifth aspects, process 700 includes deactivating the one or more radio frequency components after outputting the notification and before receiving the user input.

In a seventh aspect, alone or in combination with one or more of the first through sixth aspects, process 700 includes activating the one or more radio frequency components and performing the cell acquisition procedure based at least in part on a determination that the user input has not been received for a threshold amount of time.

In an eighth aspect, alone or in combination with one or more of the first through seventh aspects, selectively deactivating the one or more radio frequency components of the UE based at least in part on the user input comprises deactivating the one or more radio frequency components based at least in part on receiving user input that indicates to deactivate the one or more radio frequency components; and process 700 includes activating the one or more radio frequency components and performing the cell acquisition procedure after deactivating the one or more radio frequency components based at least in part on a determination that an activation condition is satisfied.

In a ninth aspect, alone or in combination with one or more of the first through eighth aspects, the activation condition includes at least one of: a determination that a current GPS location of the UE differs from a prior GPS location of the UE by a threshold amount, wherein the prior GPS location is a GPS location of the UE during performance of the cell acquisition procedure, while the notification is being output, or when the one or more radio frequency components are deactivated; a determination that the current GPS location of the UE is associated with network coverage; a determination that a stored wireless local area network identifier or a stored wireless personal area network identifier has been detected; a determination that a threshold number of wireless local area networks or wireless personal area networks have been detected; or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
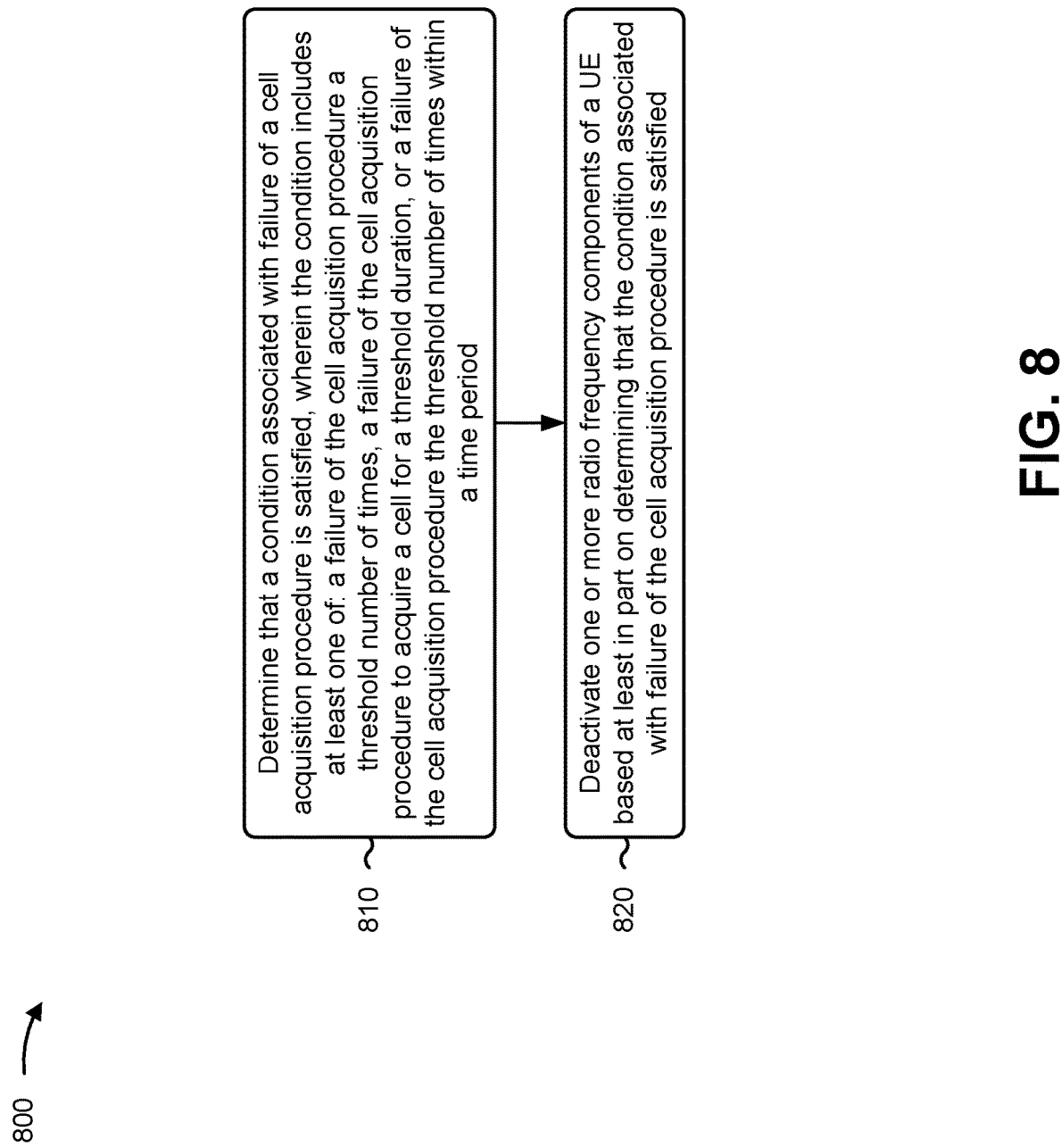
FIG. 8 is a diagram illustrating another example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with out of service notification and deactivation of radio frequency components.

As shown in FIG. 8, in some aspects, process 800 may include determining that a condition associated with failure of a cell acquisition procedure is satisfied, wherein the condition includes at least one of: a failure of the cell acquisition procedure a threshold number of times, a failure of the cell acquisition procedure to acquire a cell for a threshold duration, or a failure of the cell acquisition procedure the threshold number of times within a time period (block 810). For example, the UE (e.g., using receive processor 258, controller/processor 280, memory 282, and/or the like) may determine that a condition associated with failure of a cell acquisition procedure is satisfied, as described above. In some aspects, the condition includes at least one of a failure of the cell acquisition procedure a threshold number of times, a failure of the cell acquisition procedure to acquire a cell for a threshold duration, or a failure of the cell acquisition procedure the threshold number of times within a time period.

As further shown in FIG. 8, in some aspects, process 800 may include deactivating one or more radio frequency components of the UE based at least in part on determining that the condition associated with failure of the cell acquisition procedure is satisfied (block 820). For example, the UE (e.g., using receive processor 258, transmit processor 264, controller/processor 280, memory 282, and/or the like) may deactivate one or more radio frequency components of the UE based at least in part on determining that the condition associated with failure of the cell acquisition procedure is satisfied, as described above.

Process 800 may include additional aspects, such as any single aspect or any combination of aspects described below and/or in connection with one or more other processes described elsewhere herein.

In a first aspect, the one or more radio frequency components of the UE are deactivated further based at least in part on a user setting that indicates that the one or more radio frequency components of the UE are to be deactivated if the condition associated with failure of the cell acquisition procedure is satisfied.

In a second aspect, alone or in combination with the first aspect, the cell acquisition procedure includes at least one of an acquisition database scan, a full band scan, a full RAT scan, or a combination thereof.

In a third aspect, alone or in combination with one or more of the first and second aspects, process 800 includes activating the one or more radio frequency components and performing the cell acquisition procedure after deactivating the one or more radio frequency components based at least in part on a determination that an activation condition is satisfied.

In a fourth aspect, alone or in combination with one or more of the first through third aspects, the activation condition includes at least one of: expiration of an activation timer that is initialized upon deactivating the one or more radio frequency components; a determination that a current global positioning system (GPS) location of the UE differs from a prior GPS location of the UE by a threshold amount, wherein the prior GPS location is a GPS location of the UE during performance of the cell acquisition procedure or when the one or more radio frequency components are deactivated; a determination that the current GPS location of the UE is associated with network coverage; a determination that a stored wireless local area network identifier or a stored wireless personal area network identifier has been detected; a determination that a threshold number of wireless local area networks or wireless personal area networks have been detected; or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a condition associated with failure of a cell acquisition procedure is satisfied;
    outputting a notification that permits a user of the UE to provide input indicating whether to deactivate one or more radio frequency components of the UE based at least in part on determining that the condition associated with failure of the cell acquisition procedure is satisfied;
    receiving user input that indicates whether to deactivate the one or more radio frequency components of the UE based at least in part on outputting the notification; and
    selectively deactivating the one or more radio frequency components of the UE based at least in part on the user input.

2. The method of claim 1, wherein the condition includes at least one of a failure of the cell acquisition procedure a threshold number of times, a failure of the cell acquisition procedure to acquire a cell for a threshold duration, or a failure of the cell acquisition procedure the threshold number of times within a time period.

3. The method of claim 1, wherein the cell acquisition procedure includes at least one of an acquisition database scan, a full band scan, or a full radio access technology (RAT) scan.

4. The method of claim 1, wherein determining that the condition associated with failure of the cell acquisition procedure is satisfied comprises:
    determining that the cell acquisition procedure has failed;
    incrementing a counter value that indicates a number of times that the cell acquisition procedure has failed; and
    determining that the counter value satisfies a threshold.

5. The method of claim 1, wherein determining that the condition associated with failure of the cell acquisition procedure is satisfied comprises:
    initializing a timer upon performing an initial cell acquisition procedure after powering on the UE or losing a network connection; and
    determining that the timer has expired without successfully acquiring a cell.

6. The method of claim 1, wherein deactivation of the one or more radio frequency components prevents communication via one or more wireless networks.

7. The method of claim 1, further comprising deactivating the one or more radio frequency components after outputting the notification and before receiving the user input.

8. The method of claim 7, further comprising activating the one or more radio frequency components and performing the cell acquisition procedure based at least in part on a determination that the user input has not been received for a threshold amount of time.

9. The method of claim 1, wherein selectively deactivating the one or more radio frequency components of the UE based at least in part on the user input comprises deactivating the one or more radio frequency components based at least in part on receiving user input that indicates to deactivate the one or more radio frequency components; and
    wherein the method further comprises activating the one or more radio frequency components and performing the cell acquisition procedure after deactivating the one or more radio frequency components based at least in part on a determination that an activation condition is satisfied.

10. The method of claim 9, wherein the activation condition includes at least one of:
    expiration of an activation timer that is initialized upon deactivating the one or more radio frequency components;
    a determination that a current global positioning system (GPS) location of the UE differs from a prior GPS location of the UE by a threshold amount, wherein the prior GPS location is a GPS location of the UE during performance of the cell acquisition procedure, while the notification is being output, or when the one or more radio frequency components are deactivated;

a determination that the current GPS location of the UE is associated with network coverage;
a determination that a stored wireless local area network identifier or a stored wireless personal area network identifier has been detected; or
a determination that a threshold number of wireless local area networks or wireless personal area networks have been detected.

11. A method of wireless communication performed by a user equipment (UE), comprising:
determining that a condition associated with failure of a cell acquisition procedure is satisfied, wherein the condition includes at least one of:
a failure of the cell acquisition procedure a threshold number of times,
a failure of the cell acquisition procedure to acquire a cell for a threshold duration, or
a failure of the cell acquisition procedure the threshold number of times within a time period; and
deactivating one or more radio frequency components of the UE based at least in part on:
determining that the condition is satisfied, and
a user setting that indicates that the one or more radio frequency components are to be deactivated when the condition is satisfied.

12. The method of claim 11, wherein the cell acquisition procedure includes at least one of an acquisition database scan, a full band scan, or a full radio access technology (RAT) scan.

13. The method of claim 11, further comprising activating the one or more radio frequency components and performing the cell acquisition procedure after deactivating the one or more radio frequency components based at least in part on a determination that an activation condition is satisfied.

14. The method of claim 13, wherein the activation condition includes at least one of:
expiration of an activation timer that is initialized upon deactivating the one or more radio frequency components;
a determination that a current global positioning system (GPS) location of the UE differs from a prior GPS location of the UE by a threshold amount, wherein the prior GPS location is a GPS location of the UE during performance of the cell acquisition procedure or when the one or more radio frequency components are deactivated;
a determination that the current GPS location of the UE is associated with network coverage;
a determination that a stored wireless local area network identifier or a stored wireless personal area network identifier has been detected; or
a determination that a threshold number of wireless local area networks or wireless personal area networks have been detected.

15. A user equipment (UE) for wireless communication, comprising:
a memory; and
one or more processors operatively coupled to the memory, the memory and the one or more processors configured to:
determine that a condition associated with failure of a cell acquisition procedure is satisfied;
output a notification that permits a user of the UE to provide input indicating whether to deactivate one or more radio frequency components of the UE based at least in part on determining that the condition associated with failure of the cell acquisition procedure is satisfied;
receive user input that indicates whether to deactivate the one or more radio frequency components of the UE based at least in part on outputting the notification; and
selectively deactivate the one or more radio frequency components of the UE based at least in part on the user input.

16. The UE of claim 15, wherein the condition includes at least one of a failure of the cell acquisition procedure a threshold number of times, a failure of the cell acquisition procedure to acquire a cell for a threshold duration, or a failure of the cell acquisition procedure the threshold number of times within a time period.

17. The UE of claim 15, wherein the cell acquisition procedure includes at least one of an acquisition database scan, a full band scan, or a full radio access technology (RAT) scan.

18. The UE of claim 15, wherein the one or more processors, when determining that the condition associated with failure of the cell acquisition procedure is satisfied, are further configured to:
determine that the cell acquisition procedure has failed;
increment a counter value that indicates a number of times that the cell acquisition procedure has failed; and
determine that the counter value satisfies a threshold.

19. The UE of claim 15, wherein the one or more processors, when determining that the condition associated with failure of the cell acquisition procedure is satisfied, are further configured to:
initialize a timer upon performing an initial cell acquisition procedure after powering on the UE or losing a network connection; and
determine that the timer has expired without successfully acquiring a cell.

20. The UE of claim 15, wherein deactivation of the one or more radio frequency components prevents communication via one or more wireless networks.

21. The UE of claim 15, wherein the one or more processors are further configured to deactivate the one or more radio frequency components after outputting the notification and before receiving the user input.

22. The UE of claim 21, wherein the one or more processors are further configured to activate the one or more radio frequency components and perform the cell acquisition procedure based at least in part on a determination that the user input has not been received for a threshold amount of time.

23. The UE of claim 15, wherein the one or more processors, when selectively deactivating the one or more radio frequency components of the UE based at least in part on the user input, are configured to deactivate the one or more radio frequency components based at least in part on receiving user input that indicates to deactivate the one or more radio frequency components; and
wherein the one or more processors are further configured to activate the one or more radio frequency components and performing the cell acquisition procedure after deactivating the one or more radio frequency components based at least in part on a determination that an activation condition is satisfied.

24. The UE of claim 23, wherein the activation condition includes at least one of:

expiration of an activation timer that is initialized upon deactivating the one or more radio frequency components;

a determination that a current global positioning system (GPS) location of the UE differs from a prior GPS location of the UE by a threshold amount, wherein the prior GPS location is a GPS location of the UE during performance of the cell acquisition procedure, while the notification is being output, or when the one or more radio frequency components are deactivated;

a determination that the current GPS location of the UE is associated with network coverage;

a determination that a stored wireless local area network identifier or a stored wireless personal area network identifier has been detected; or a determination that a threshold number of wireless local area networks or wireless personal area networks have been detected.

25. A user equipment (UE) for wireless communication, comprising:

a memory; and one or more processors operatively coupled to the memory, the memory and the one or more processors configured to:

determine that a condition associated with failure of a cell acquisition procedure is satisfied, wherein the condition includes at least one of:

a failure of the cell acquisition procedure a threshold number of times, a failure of the cell acquisition procedure to acquire a cell for a threshold duration, or a failure of the cell acquisition procedure the threshold number of times within a time period; and deactivate one or more radio frequency components of the UE based at least in part on:

a determination that the condition is satisfied, and a user setting that indicates that the one or more radio frequency components are to be deactivated when the condition is satisfied.

26. The UE of claim 25, wherein the cell acquisition procedure includes at least one of an acquisition database scan, a full band scan, or a full radio access technology (RAT) scan.

27. The UE of claim 25, wherein the one or more processors are further configured to activate the one or more radio frequency components and perform the cell acquisition procedure after deactivating the one or more radio frequency components based at least in part on a determination that an activation condition is satisfied.

28. The UE of claim 27, wherein the activation condition includes at least one of:

expiration of an activation timer that is initialized upon deactivating the one or more radio frequency components;

a determination that a current global positioning system (GPS) location of the UE differs from a prior GPS location of the UE by a threshold amount, wherein the prior GPS location is a GPS location of the UE during performance of the cell acquisition procedure or when the one or more radio frequency components are deactivated;

a determination that the current GPS location of the UE is associated with network coverage;

a determination that a stored wireless local area network identifier or a stored wireless personal area network identifier has been detected; or a determination that a threshold number of wireless local area networks or wireless personal area networks have been detected.

29. The method of claim 11, wherein the time period is a threshold time period configured for the UE by a base station.

30. The UE of claim 25, wherein the time period is a threshold time period stored in the memory.

* * * * *